Figure 1:
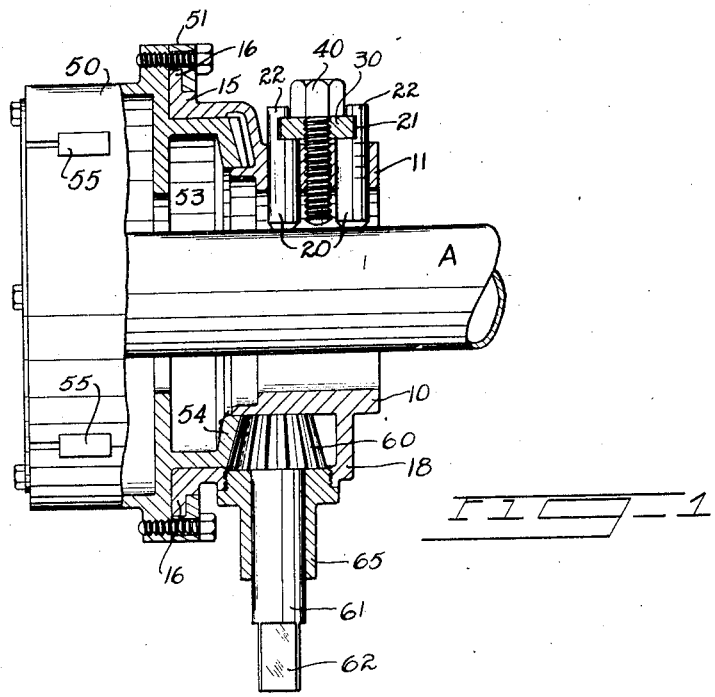

Feb. 5, 1929.

V. T. SPRAGUE 1,701,281

CENTERING CLAMP FOR PIPE WORKING TOOLS

Filed Feb. 29, 1928   2 Sheets-Sheet 1

Inventor
Vernon T. Sprague,
By Bates, Macklin, Johnick & Tear,
Attorneys

Feb. 5, 1929.  
V. T. SPRAGUE  
1,701,281  
CENTERING CLAMP FOR PIPE WORKING TOOLS  
Filed Feb. 29, 1928  2 Sheets-Sheet 2

Inventor  
Vernon T. Sprague,  
By Bakis, Macklin, Solnick & Peare  
Attorneys

Patented Feb. 5, 1929.

1,701,281

UNITED STATES PATENT OFFICE.

VERNON T. SPRAGUE, OF WARREN, OHIO, ASSIGNOR TO THE BORDEN COMPANY, OF WARREN, OHIO, A CORPORATION OF OHIO.

CENTERING CLAMP FOR PIPE-WORKING TOOLS.

Application filed February 29, 1928. Serial No. 257,886.

This invention relates to means for centrally clamping about a pipe, the stationary portion of a pipe working tool, as for instance a die stock. The primary object of the invention is to provide a clamping device which will very firmly hold the stationary annular frame to the pipe.

My clamp is well adapted for that type of die stock, suitable for comparatively large pipes, where a driving mechanism is mounted on the clamp and accordingly the rotative thrust is taken by the stationary frame, and thus there is considerable stress on the clamp tending to turn it about the pipe. To the above end, I provide sets of radial abutment members carried by the stationary frame and suitable screw mechanism for simultaneously forcing the members of a set toward the pipe. This enables me to obtain a very effective clamping.

Furthermore, I provide indications on the abutment members to designate the different sizes of pipe for which they may be positioned, and thus each set may be accurately located to cause the pipe to be centered.

A preferred embodiment of my invention is illustrated in the drawings in conjunction with a die stock having a driving member mounted on the stationary frame.

Figure 2:
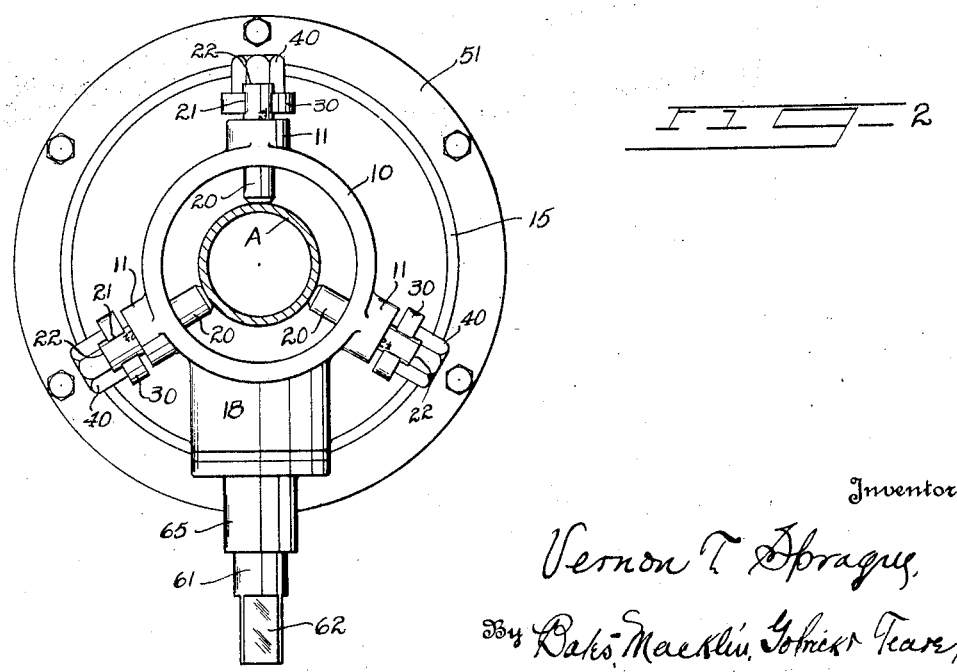
Figure 3:
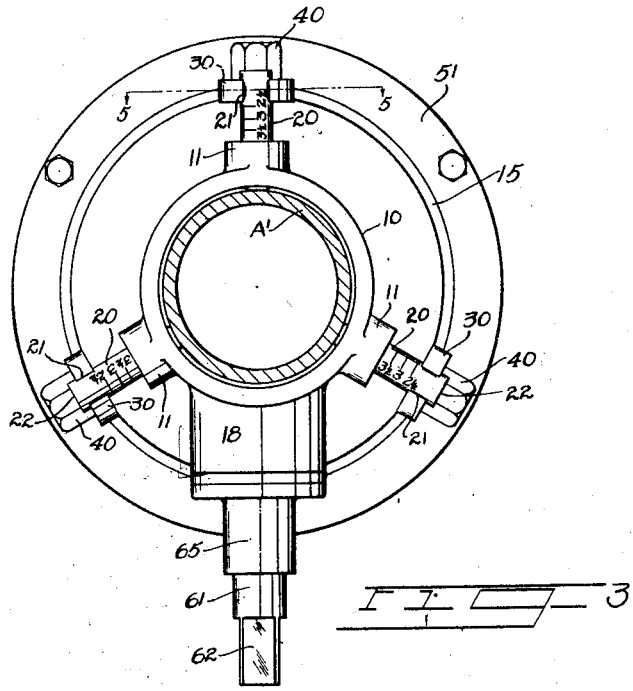
Figure 4:
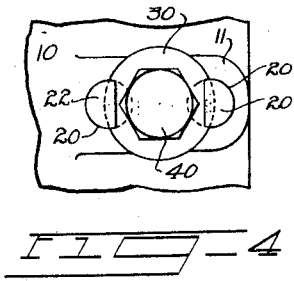
Figure 5:
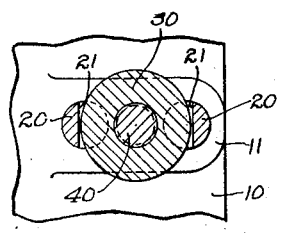
Figure 6:
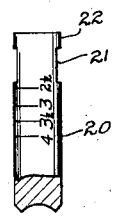

Fig. 1 is a sectional side elevation of such clamp and die stock; Fig. 2 is an end elevation of the same looking from the right hand end, and showing the clamp engaging the smallest pipe for which the device is adapted; Fig. 3 is a similar view showing the clamp engaging the largest size pipe within the range of the machine; Fig. 4 is a fragmentary view of one of the sets of abutment members looking radially inward at the head thereof; Fig. 5 is a cross-section through the same, as indicated by the line 5—5 on Fig. 3; Fig. 6 is a sectional side elevation of one of the abutment members detached.

In the drawings, 10 indicates the annular stationary frame which may surround pipes of various sizes, as the small size pipe A in Figs. 1 and 2, or the large size pipe $A^1$ in Fig. 3. This frame has a cylindrical portion of material length on the outer surface of which are formed equi-distant bosses 11. There are preferably three of these, 120° apart. Extending through the frame ring, at the respective bosses, are the clamping units.

Each clamping unit includes a plurality of longitudinally aligned, simultaneously operated radial plungers. I prefer to employ a pair of cylindrical plungers occupying a pair of cylindrical holes through the frame ring. Each plunger is formed with a lateral recess 21 near its outer end and a head flange 22 slightly overhanging the base of the recess. The two recesses in each clamping unit shown face each other and are occupied by a disk 30. Passing through this disk is a clamping screw 40, which is threaded into the boss and ring 11, 10 and has an angular head overhanging the disk.

It results from the above construction that if the screw 40 is turned in, the two plungers 20 are correspondingly forced radially inwardly. In this forcing action the head of the screw engages the cross-head disk 30 for a considerable area and the disk engages the plungers 20 for a considerable area so that a very effective inward forcing action is obtained.

A reverse movement of the screw 40 relieves the pressure on the plungers 20 and either carries them outwardly or allows them to be moved outwardly, in either case releasing the pipe. If the disk 30 is internally threaded and screwed on the shank of the screw 30 tightly against the head, so as to rotate it as a unit with the screw, then the outward turning of the screw carries the plungers 20 with it. On the other hand if the disk 30 has simply a cylindrical hole in it, so that the screw shank passes freely through it, the turning out of the screw does not of itself retract the plungers but enables them to be shoved out by hand.

As the three clamping units are set independently by turning in the corresponding screws 40, it is desirable that they be marked to indicate their position. Accordingly, I form graduations on the plungers, or at least on that one which is visible from the adjacent exposed end of the clamp, which graduations coact with the outer surface of the boss 11 to indicate the position.

As will be noticed from Fig. 5, the notches in the plungers 20 may have straight outer walls, which enable such notches to be conveniently machined, and also prevents any undue binding of the crosshead disk. At the same time the plungers cannot turn on their own axis sufficiently to remove the size-marking from a very visible position. The overhanging flange 22 of the plungers above the crosshead is considerably less than the portion of the plunger beneath the crosshead, thus allowing plenty of room for the head of the screw 40. At the same time this overhang is sufficient to enable the crosshead if moved outwardly, to pull out the corresponding plungers.

The stationary frame 10 may carry the die stock or other pipe working tool in any suitable manner. As shown it has a cup-like extension 15 formed with an outward flange 16. The die stock frame, indicated at 50, abuts this flange and has secured to it a ring 51 overhanging the frame flange, whereby the die stock frame is rotatably mounted on the stationary frame 10.

In Fig. 1, I have shown the die stock frame as having a cylindrical portion 53 extending within the cup of the stationary frame and terminating in a bevel gear 54. This gear meshes with a bevel pinion 60 mounted on the inner end of a drive shaft 61 which is journalled in a radial bearing on the stationary frame. As shown, this drive shaft is journalled in a sleeve 65 which is screw threaded, or otherwise secured, to an approximately cylindrical boss 18 formed on the stationary frame 10.

With the mechanism above described, when the stationary frame is clamped on the pipe, a crank applied to the squared outer end 62 of the drive shaft may rotate the pinion 60 and thus powerfully rotate the die stock head and cut or thread the pipe by means of chasers 55 or other tools carried by the die stock head. It will be seen that this method of driving and cutting tools throws severe rotative stress on the clamp, and it is to receive such stress that I have designed the powerful clamping means shown and described.

I claim:—

1. A centering clamp for a pipe working tool comprising an annular frame and a plurality of clamping units carried thereby and adapted to engage a pipe surrounded by the frame, each clamping unit comprising a plurality of longitudinally aligned inwardly movable members and a forcing device to move said members inwardly simultaneously.

2. In a centering clamp, the combination of an annular frame, a plurality of clamping units mounted therein and adapted to engage a pipe surrounded by the frame, each unit comprising a plurality of longitudinally aligned slidable plungers, and mechanism for operating them simultaneously.

3. In a centering clamp, the combination of an annular frame, a plurality of clamping units spaced about the frame and operating radially toward the axis thereof, each unit comprising a pair of radially movable plungers in longitudinal alignment and means independent for each pair for forcing both members of the pair inward simultaneously.

4. In a centering clamp for pipe working tools, the combination of an annular frame adapted to surround a pipe, and a clamping unit slidably mounted in the frame and comprising a plurality of movable plungers, a crosshead engaging such plurality of plungers, and screw means for moving the crosshead.

5. In a pipe working tool, the combination of an annular frame, a pair of longitudinally aligned plungers mounted radially therein, a screw threaded in the frame between the plungers, and a cross member carried by the screw and adapted to engage the two plungers to force the same inwardly, to engage the pipe.

6. In a centering clamp, the combination of an annular frame, a pair of plungers mounted therein movably toward and from the center of the frame, said plungers having notches facing each other, a cross member occupying said notches, and means for forcing said cross member inwardly.

7. In a centering clamp, the combination of an annular frame, a pair of longitudinally aligned radial plungers slidably mounted therein, said plungers having notches beyond the frame facing each other, a screw mounted in the frame between the plungers, and a cross member occupying said notches and adapted to be forced inward by the screw.

8. In a clamp for a pipe working tool, the combination of an annular frame, a pair of plungers radially mounted therein in longitudinal alignment, each plunger extending beyond the outside of the frame and there having a notch facing the other plunger, a disk occupying the two notches and having a central hole, and a cap screw passing through the disk and threaded into the frame, and having a head bearing against the outer face of the disk.

9. In a centering clamp, the combination of an annular frame adapted to surround a pipe and having three bosses formed on the exterior of the frame, a pair of clamping plungers in longitudinal alignment radially mounted in each of the bosses and slidable therethrough, a screw device for forcing in each pair of plungers as a unit, and marks on each plunger adjacent the exposed end of the annular frame for coacting with the faces of the respective bosses to indicate the position of the clamping units.

In testimony whereof, I hereunto affix my signature.

VERNON T. SPRAGUE.